United States Patent
Sugaya

(10) Patent No.: US 10,887,195 B2
(45) Date of Patent: Jan. 5, 2021

(54) COMPUTER SYSTEM, REMOTE CONTROL NOTIFICATION METHOD AND PROGRAM

(71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 0 days.

(21) Appl. No.: 16/608,992

(22) PCT Filed: Apr. 28, 2017

(86) PCT No.: PCT/JP2017/016940
§ 371 (c)(1),
(2) Date: Oct. 28, 2019

(87) PCT Pub. No.: WO2018/198318
PCT Pub. Date: Nov. 1, 2018

(65) Prior Publication Data
US 2020/0195518 A1  Jun. 18, 2020

(51) Int. Cl.
| | |
|---|---|
| *H04L 12/24* | (2006.01) |
| *G16Y 40/35* | (2020.01) |
| *G06F 3/0484* | (2013.01) |
| *G06K 9/00* | (2006.01) |
| *G06K 9/20* | (2006.01) |

(52) U.S. Cl.
CPC .......... *H04L 41/22* (2013.01); *G06F 3/04842* (2013.01); *G06K 9/00671* (2013.01); *G06K 9/209* (2013.01); *G16Y 40/35* (2020.01)

(58) Field of Classification Search
None
See application file for complete search history.

(56) References Cited

U.S. PATENT DOCUMENTS

| | | | |
|---|---|---|---|
| 7,209,803 B2* | 4/2007 | Okamoto | B25J 5/007 318/568.12 |
| 8,345,925 B2* | 1/2013 | Fukuchi | H04N 5/4403 382/103 |

(Continued)

FOREIGN PATENT DOCUMENTS

| | | |
|---|---|---|
| JP | 2011146796 A | 7/2011 |
| JP | 2016181751 A | 10/2016 |

OTHER PUBLICATIONS

International Search Report issued in PCT/JP2017/016940 dated Jul. 11, 2017.

*Primary Examiner* — David H Chu
(74) *Attorney, Agent, or Firm* — Norton Rose Fulbright US LLP; James R. Crawford

(57) ABSTRACT

Provided are a computer system, a remote control notification method and a program. This computer system acquires an image of an IoT device, determines, from the acquired image, the IoT device which is capable of being remotely controlled by a user who visually confirms the image, and, in a position where the image of the IoT device determined to be remotely controllable is captured, displays with augmented reality that remote control is possible. Further, the computer system pre-stores images of the remotely controllable IoT device, and, on the basis of the pre-stored images of the IoT device, determines that the IoT device is remotely controllable through image recognition which involves comparing the pre-stored images with the acquired image.

4 Claims, 11 Drawing Sheets

(56) References Cited

U.S. PATENT DOCUMENTS

| | | | |
|---|---|---|---|
| 2011/0170742 A1* | 7/2011 | Fukuchi | H04N 21/43615 382/103 |
| 2015/0199066 A1* | 7/2015 | Kim | G06F 3/0416 345/173 |
| 2015/0302650 A1* | 10/2015 | Abdelmoati | G06F 3/0488 345/633 |
| 2015/0363636 A1* | 12/2015 | Tate | G06K 9/00295 382/103 |
| 2016/0217617 A1* | 7/2016 | Barribeau | G06F 3/04883 |
| 2016/0328883 A1* | 11/2016 | Parfenov | G06T 13/00 |
| 2018/0040161 A1* | 2/2018 | Tierney | G06F 3/015 |
| 2018/0054487 A1* | 2/2018 | Hebsur | G06F 1/1686 |
| 2018/0095542 A1* | 4/2018 | Mallinson | G06F 1/163 |
| 2018/0196522 A1* | 7/2018 | Rochford | G06F 1/163 |
| 2018/0204385 A1* | 7/2018 | Sarangdhar | G06T 19/006 |

\* cited by examiner

COMPUTER SYSTEM, REMOTE CONTROL NOTIFICATION METHOD AND PROGRAM

This application is a national phase under 35 U.S.C. § 371 of International Application No. PCT/JP2017/016940 filed Apr. 28, 2017, the entire contents of which is incorporated herein by reference in its entirety.

TECHNICAL FIELD

The present invention relates to a computer system for sharing a screen between an instructing terminal and a to-be-instructed terminal, a remote control notification method and a program.

BACKGROUND

In recent years, a method for sharing a screen has been known, which is implemented by a to-be-instructed terminal held by a to-be-instructed person which accepts an instruction for remote control and an instructing terminal held by an instructor which gives an instruction for remote control. Now, an instructing method has been known, which is implemented by capturing an image of an object to accept an instruction and performing instructing by using so-called augmented reality which can overlay instructing content with the object.

Sometimes, when an instruction involving augmented reality is accepted, an Internet of Things (IoT) device which can be remotely controlled is determined visually in a captured real world. In this case, it is desirable that a user as an instructor or a to-be-instructed person may remotely control the IoT device.

As a component for displaying such augmented reality, a component which displays instructing content from an instructor on a wearable terminal of a to-be-instructed person has been disclosed (referring to Patent Document 1).

LITERATURE IN THE RELATED ART

Patent Document

Patent Document 1: Japanese Patent Publication No. JP2016-181751.

SUMMARY

Problem to be Solved in the Invention

However, in the component in Patent Document 1, it is difficult to determine whether an IoT device which can be remotely controlled is in a displayed screen and whether an object to accept instructing content is the remotely controllable IoT device The purpose of the present invention is to provide a computer system which, during remote operation support, can display an IoT device that can be remotely controlled by a user (one or both of an instructor and a to-be-instructed person), and to provide a remote control notification method and a program.

Solution to the Problem

The present invention provides the following solutions.

The present invention provides a computer system. The computer system includes: an acquisition unit, which is configured to acquire an image of an IoT device; a determination unit, which is configured to determine, from the acquired image, the IoT device which is capable of being remotely controlled by a user who visually confirms the image; and, a notification unit, which is configured to, in a position where the image of the IoT device determined to be remotely controllable is captured, display a status that remote control is possible through augmented reality.

According to the present invention, the computer system is configured to: acquire images of IoT devices, determine, from the acquired images, the IoT device which is capable of being remotely controlled by a user who visually confirms the image of the IoT device, and, in a position where the image of the IoT device determined to be remotely controllable is captured, display the status that remote control is possible through augmented reality.

The present invention belongs to the field of computer systems, but in other fields such as a remote control notification method and a program, it still has the same effect and performance as those in this field.

Effect of the Invention

According to the present invention, a computer system which, during remote operation support, can display an IoT device that can be remotely controlled by a user, a remote control notification method and a program are provided.

DETAILED DESCRIPTION

Optimum embodiments for implementing the present invention will be described below with reference to the drawings. It is to be noted that the embodiments are merely examples and not intended to limit the scope of the present invention.

(Summary of a Remote Control Notification System 1)

Figure 1:
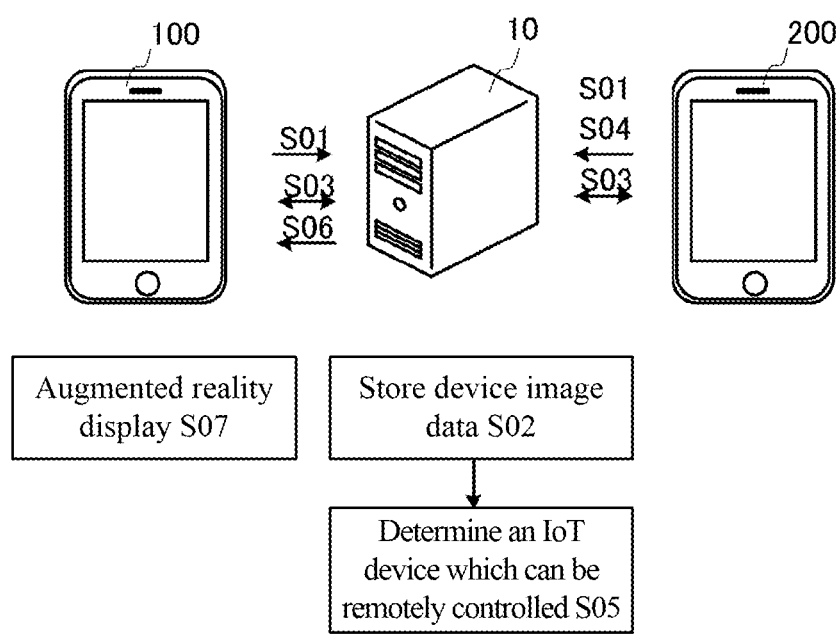
FIG. 1 is a schematic diagram of a remote control notification system 1.

The summary of a preferred embodiment of the present invention will be described based on FIG. 1. FIG. 1 is a diagram used for describing the summary of the remote control notification system 1 as a preferred embodiment of the present invention. The remote control notification system 1 includes a computer 10, an instructing terminal 100 and a to-be-instructed terminal 200, and is a computer system where the instructing terminal 100 and the to-be-instructed terminal 200 share a screen via the computer 10.

It is to be noted that in FIG. 1, the number of computers 10, instructing terminals 100 and to-be-instructed terminals 200 may be changed appropriately. Furthermore, the computer 100, the instructing terminal 100 and the to-be-instructed terminal 200 are not limited to be actual apparatuses, but may be virtual apparatuses. Furthermore, processing described later may also be implemented by any one of the computer 100, the instructing terminal 100 and the to-be-instructed terminal 200 or by a combination consisting of more than one of the above apparatuses. Furthermore, the computer system 1 may also consist of the instructing terminal 100 and the to-be-instructed terminal 200 with no computer 10. In this case, any one or both of the instructing terminal 100 and the to-be-instructed terminal 200 may execute processing which is supposed to be executed by the computer 10.

The computer 10 is a computer device connected to the instructing terminal 100 and the to-be-instructed terminal 200, so that data communication can be performed.

The instructing terminal 100 is a terminal device connected to the computer 10, so that data communication can be performed. The instructing terminal 100 is a terminal device held by an instructor as a user giving an instruction during the remote operation support. The instructing terminal 100 is, for example, a portable phone, a portable information terminal, a tablet terminal or a personal computer, and in addition, the instructing terminal 100 may also be a laptop computer terminal, a slate terminal, an electronic book terminal, an electrical appliance such as a portable music player, a wearable terminal such as smart glasses and a head-mounted display, or other devices.

The to-be-instructed terminal 200 is a terminal device connected to the computer 10, so that data communication can be performed. The to-be-instructed terminal 200 is a terminal device held by a to-be-instructed person as a user accepting an instruction during the remote operation support. The to-be-instructed terminal 200 is an electrical appliance, a wearable terminal or other devices the same as the above instructing terminal 100.

First, any one or both of the instructing terminal 100 and the to-be-instructed terminal 200 sends device image data of a remotely controllable IoT device to the computer 10 (step S01). The instructing terminal 100 or the to-be-instructed terminal 200 sends the device image data to the computer 10, and the device image data matches device images of the remotely controllable IoT device captured from one or more specific directions with an identifier of the IoT device (name, model, IP address, MAC address, etc.). In this case, the device image may be a device image previously captured, or may be a newly captured device image.

The computer 10 receives the device image data, and stores the received device image data (step S02).

The instructing terminal 100 and the to-be-instructed terminal 200 share a screen (step S03). The to-be-instructed terminal 200 shares a part or all of a specific window and a specific screen area displayed by itself with the instructing terminal 100. In this case, an image for screen sharing is a captured image displayed by the to-be-instructed terminal 200. During the screen sharing, the to-be-instructed terminal 200 performs the screen sharing by sending screen data of an object to be displayed by the to-be-instructed terminal 200 to the instructing terminal 100 via the computer 10.

The to-be-instructed terminal 200 sends the captured image to the computer 10 as captured image data (step S04). The to-be-instructed terminal 200 captures images of a site and articles needed by the remote operation support, and sends the captured images to the computer 10 as the captured image data. The IoT device is captured in the captured image. The captured image data sent by the to-be-instructed terminal 200 may be images that have been captured so far, or may be images captured this time.

The computer 10 receives the captured image data, and acquires the images of the IoT devices by receiving the captured image data. The computer 10 determines, from the acquired images, the IoT device which is capable of being remotely controlled by a user who visually confirms the captured image (step S05). On the basis of pre-stored device image data, the computer 10 determines whether the remotely controllable IoT device is captured through image recognition which involves comparing the pre-stored device image data with the acquired captured image.

For example, the computer 10 extracts feature quantities and feature points through image recognition on the device image data. The computer 10 extracts feature quantities and feature points through image recognition on the captured image data. The computer 10 determines whether identical feature quantities or feature points exist by comparing each extracted feature quantity and feature point. In a case that it is determined that identical feature quantities and feature points exist, the computer 10 determines that the IoT device is remotely controllable, while in a case it is determined that no identical feature quantity or feature point exists, the computer 10 determines that the IoT device cannot be remotely controlled.

The computer 10 sends a notification that remote control is possible to the instructing terminal 100, and the notification that remote control is possible is used to display the status that remote control is possible through augmented reality in a position where the captured image of the IoT device determined to be remotely controllable is captured (step S06).

The instructing terminal 100 receives the notification that remote control is possible. The computer 10 sends a notification that remote control is possible to the instructing terminal 100, and the notification that remote control is possible is used to display the status that remote control is possible through augmented reality in a position where the captured image of the IoT device determined to be remotely controllable is captured (step S07). The instructing terminal 100 displays a frame that surrounds the image of the IoT device as augmented reality. The instructing terminal 100 receives an input operation in the displayed frame, and, depending on input, displays a login screen (an input screen for filling an ID, a corresponding passcode and the like) for remotely controlling the IoT device. The instructing terminal 100 may remotely control the IoT device after logging into the IoT device.

The above is the summary of the remote control notification system 1.

(System Composition of the Remote Control Notification System 1)

Figure 2:
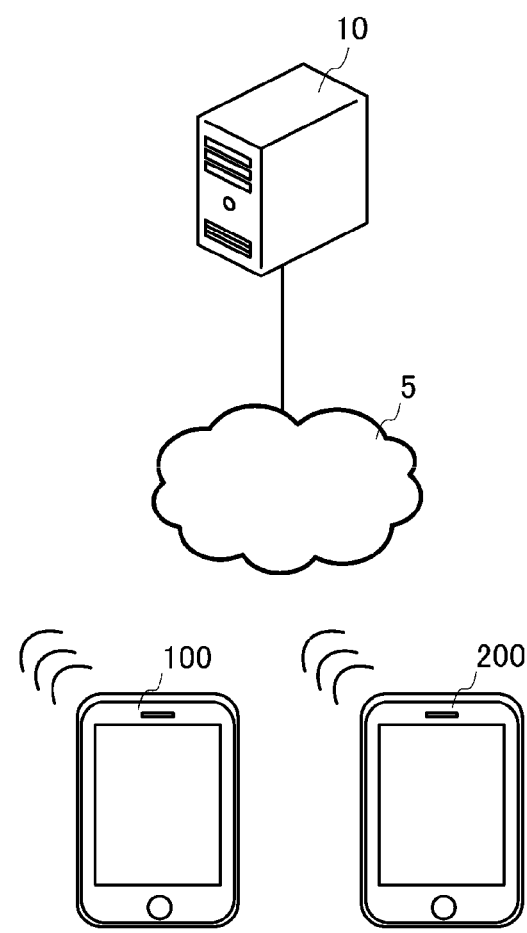
FIG. 2 is an overall structural diagram of a remote control notification system 1.

The system composition of the remote control notification system 1 as a preferred embodiment of the present invention will be described based on FIG. 2. FIG. 2 is a diagram of the system composition of the remote control notification system 1 as a preferred embodiment of the present invention. The remote control notification system 1 includes a computer 10, an instructing terminal 100, a to-be-instructed terminal 200 and a public network 5 (such as the Internet, the third or the fourth communication network, etc.), and is a computer system where the instructing terminal 100 and the to-be-instructed terminal 200 share a screen via the computer 10.

It is to be noted that the number and types of various apparatuses constituting the remote control notification system 1 may be changed appropriately. Furthermore, the remote control notification system 1 is not limited to be an actual apparatus, but may be implemented by a virtual apparatus. Furthermore, processing described later may also be implemented by any one of various apparatuses constituting the remote control notification system 1 or by a combination consisting of more than one of the above various apparatuses. Furthermore, the remote control notification system 1 may also consist of the instructing terminal 100 and the to-be-instructed terminal 200. In this case, any one or both of the instructing terminal 100 and the to-be-instructed terminal 200 may execute processing which is supposed to be executed by the computer 10.

The computer 10 is the above computer device having functions described later.

The instructing terminal 100 is the above terminal device having functions described later.

The to-be-instructed terminal 200 is the above terminal device having functions described later.

(Description of Each Function)

Figure 3:
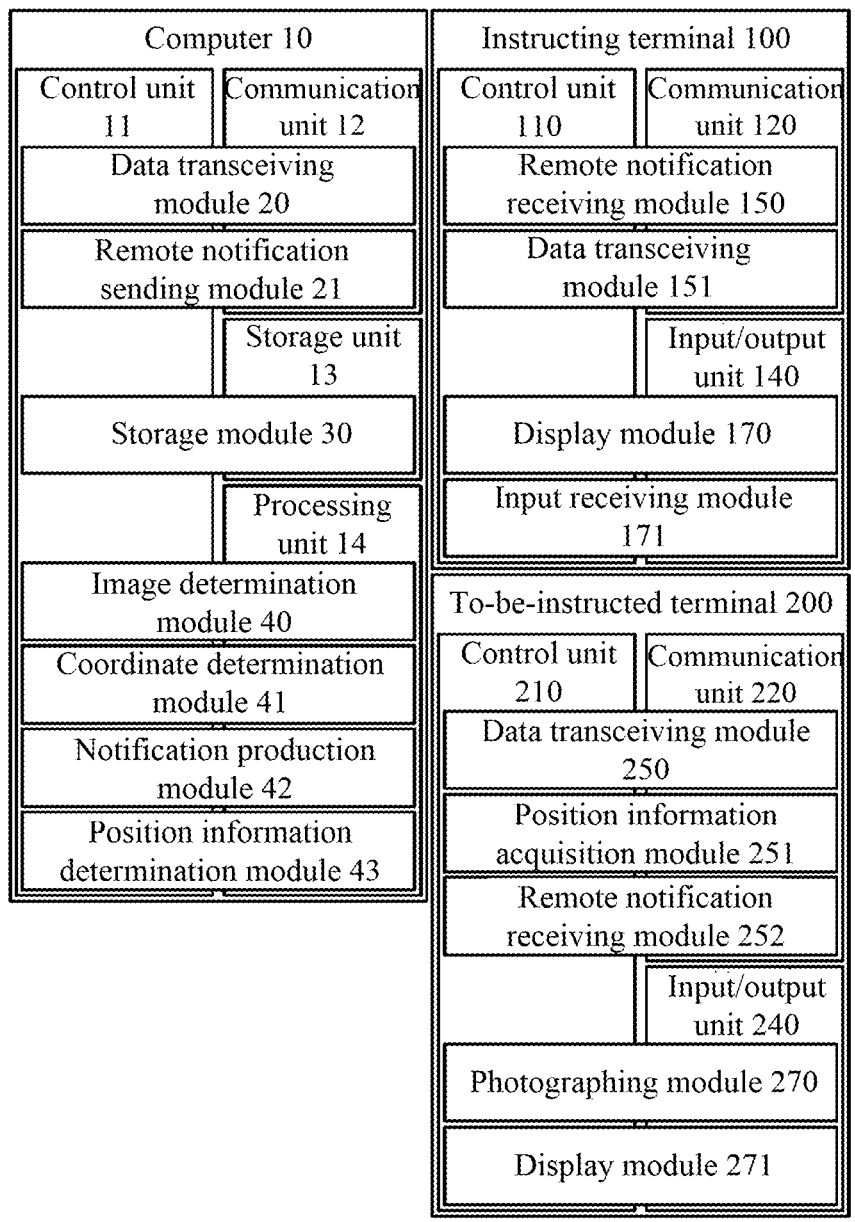
FIG. 3 is a functional block diagram of a computer 10, an instructing terminal 100 and a to-be-instructed terminal 200.

The functions of the remote control notification system 1 as a preferred embodiment of the present invention will be described based on FIG. 3. FIG. 3 is a functional block diagram of a computer 10, an instructing terminal 100 and a to-be-instructed terminal 200.

The computer 10 has a central processing unit (CPU), a random access memory (RAM), a read only memory (ROM) and the like as a control unit 11, and a component such as a wireless-fidelity (Wi-Fi) component based on IEEE802.11 which can communicate with other devices as a communication unit 12. Furthermore, the computer 10 has a store unit for storing data through a hard disk, a semiconductor memory, a recording medium, a memory card and the like as a storage unit 13. Furthermore, the computer 10 has various components for various computing and processing as a processing unit 14.

In the computer 10, the control unit 11 is configured to: read specific programs and cooperate with the communication unit 12 to implement a data transceiving module 20 and a remote notification sending module 21. Furthermore, in the computer 10, the control unit 11 reads specific programs and cooperates with the storage unit 13 to implement a storage module 30. Furthermore, in the computer 10, the control unit 11 reads specific programs and cooperates with the processing unit 14 to implement an image determination module 40, a coordinate determination module 41, a notification production module 42, and a position information determination module 43.

Similar to the computer 10, the instructing terminal 100 also has a CPU, a RAM, a ROM and the like as a control unit 110, and a component which can communicate with other devices as a communication unit 120. Furthermore, the instructing terminal 100 has a display unit for outputting and displaying data or images controlled by the control unit 110, an input unit such as a touch panel, a keyboard and a mouse for receiving input of a user, a photographing unit for capturing an image of the IoT device, and other various components as an input/output unit 140.

In the instructing terminal 100, the control unit 110 reads specific programs and cooperates with the communication unit 120 to implement a remote notification receiving module 150 and a data transceiving module 151. Furthermore, in the instructing terminal 100, the control unit 110 reads specific programs and cooperates with the input/output unit 140 to implement a display module 170 and an input receiving module 171.

Similar to the instruction terminal 100, the to-be-instructed terminal 200 also has a CPU, a RAM, a ROM and the like as a control unit 210, a component which can communicate with other devices as a communication unit 220, and a display unit, an input unit, a photographing unit and other various components as an input/output unit 240.

In the to-be-instructed terminal 200, the control unit 210 reads specific programs and cooperates with the communication unit 220 to implement a data transceiving module 250, a position information acquisition module 251 and a remote notification receiving module 252. Furthermore, in the to-be-instructed terminal 200, the control unit 210 reads specific programs and cooperates with the input/output unit 240 to implement a photographing module 270 and a display module 271.

(Device Image Data Storage Processing)

Figure 4:
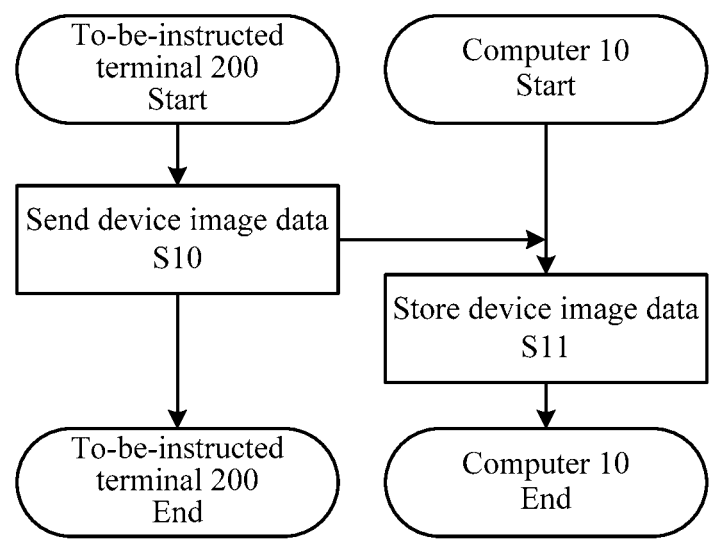
FIG. 4 is a flowchart of device image data storage processing executed by the computer 10 and the to-be-instructed terminal 200.

The device image data storage processing executed by the remote control notification computer system 1 will be described based on FIG. 4. FIG. 4 is a flowchart of device image data storage processing executed by the computer 10 and the to-be-instructed terminal 200.

Processing executed by modules of each of the above apparatuses will be described in conjunction with the current processing.

It is to be noted that the current processing is executed by the computer 10 and the instructing terminal 100. In this case, the instructing terminal 100 executes processing described later which is supposed to be executed by the to-be-instructed terminal 200, and thus details will not be described. Furthermore, the current processing may be executed by the instructing terminal 100 and the to-be-instructed terminal 200. In this case, any one or both of the instructing terminal 100 and the to-be-instructed terminal 200 may execute processing described later which is supposed to be executed by the computer 10, and thus details will not be described.

First, the data transceiving module 250 sends an image of a remotely controllable IoT device and an identifier of the IoT device (name, model, IP address, MAC address, etc.) to the computer 10 as device image data (step S10). In step S10, the image of the IoT device sent by the data transceiving module 250 is an image captured by the photographing module 270 this time, an image that the photographing module 270 has captured so far, or an image acquired from an external database, a network, etc. Furthermore, the image of the IoT device is an image captured from one or more directions. In a case that the image is captured form one direction, the data transceiving module 250 sends an image captured from one direction and an identifier as the device image data. In a case that the image is captured from more directions, the data transceiving module 250 sends multiple images captured from various directions and an identifier as the device image data.

The data transceiving module 20 receives the device image data, and the storage module 30 stores the received device image data (step S11). In step S11, the storage module 30 stores the image and identifier of the IoT device correspondingly.

The above is the device image data storage processing. The remote control notification system 1 uses the device image data stored by the computer 10 for processing described later.

(Remote Control Notification Processing)

Figure 5:
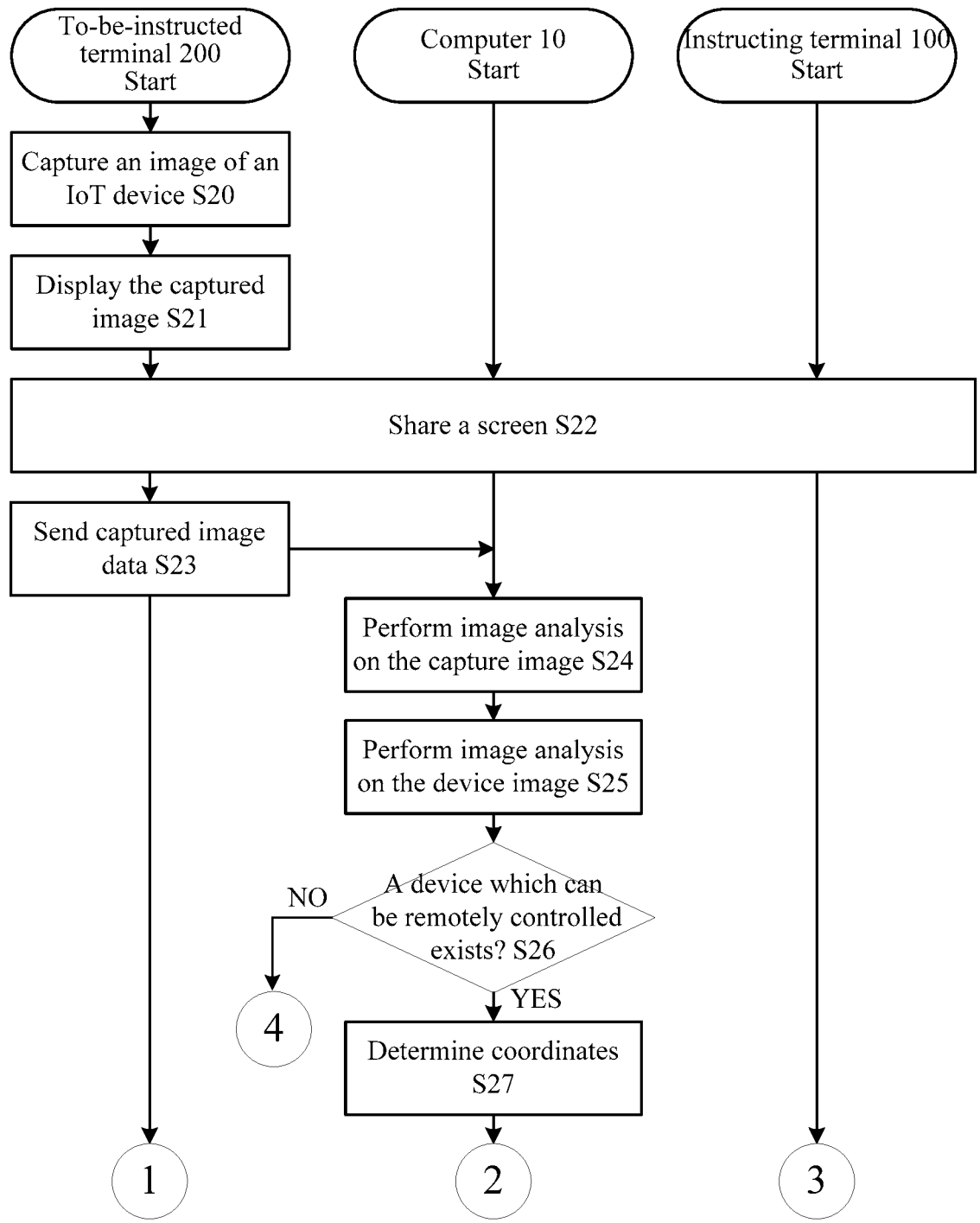
FIG. 5 is a flowchart of remote control notification processing executed by the computer 10, the instructing terminal 100 and the to-be-instructed terminal 200.
Figure 6:
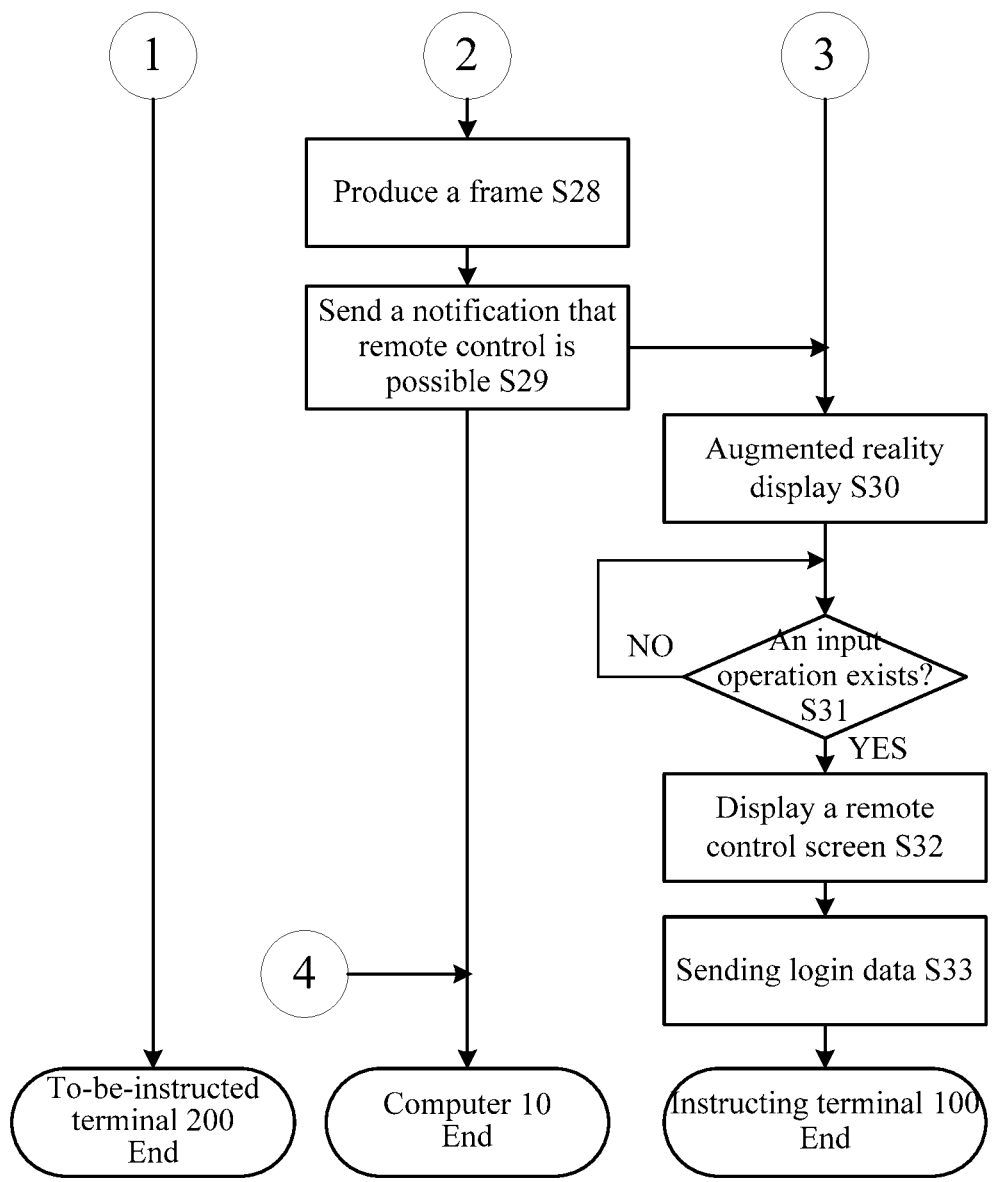
FIG. 6 is a flowchart of remote control notification processing executed by the computer 10, the instructing terminal 100 and the to-be-instructed terminal 200.

The remote control notification processing executed by the remote control notification computer system 1 will be described based on FIGS. 5 and 6. FIGS. 5 and 6 are flowcharts of remote control notification processing executed by the computer 10, the instructing terminal 100 and the to-be-instructed terminal 200. Processing performed by modules of each of the above apparatuses will be described in conjunction with the current processing.

It is to be noted that the current processing may be executed by the instructing terminal 100 and the to-be-instructed terminal 200. In this case, any one or both of the instructing terminal 100 and the to-be-instructed terminal 200 may execute processing described later which is supposed to be executed by the computer 10.

First, the photographing module 270 captures images of IoT devices (step S20). In step S20, the photographing module 270 captures an image of an IoT device in a case that a user wants to perform operation support, and thus one or more IoT devices and other electronic devices are captured in the image.

The display module 271 displays a captured image which is the image captured by the photographing module 270 (step S21). In step S21, the display module 271 may not only display the captured image captured by the photographing module 270 this time, but display captured images previously captured by the photographing module 270.

The computer 10, the instructing terminal 100 and the to-be-instructed terminal 200 share a screen of the captured image displayed by the to-be-instructed terminal 200 (step S22). In step S22, screens of a window and a screen area of the captured image displayed by the to-be-instructed terminal 200 are shared with the instructing terminal 100 via the computer 10.

The to-be-instructed terminal 200 sends screen data of the screen displayed in the window to the computer 10. The computer 10 receives the screen data, and sends the screen data to the instructing terminal 100. The instructing terminal 100 receives the screen data, and displays the screen data itself.

The data transceiving module 250 sends the captured image displayed via the processing in above step S21 to the computer 10 as captured image data (step S23). It is to be noted that the processing in step S23 and the above screen sharing may also be executed simultaneously.

The data transceiving module 20 receives the captured image data. The computer 10 acquires the image of the IoT device by receiving the captured image data.

The image determination module 40 performs image analysis on the acquired captured image (step S24). In step S24, the image determination module 40 extracts feature quantities and feature points of the captured image. For example, the image determination module 40 extracts a shape, a color and the like of an article contained in the captured image. Furthermore, the image determination module 40 extracts statistical values such as an average, a variance, and a histogram of pixel values contained in the captured image.

The image determination module 40 performs image analysis on the device image stored in the storage module 30 (step S25). In step S25, the image determination module 40 extracts feature quantities and feature points of the device image. The image determination module 40 extracts feature quantities and feature points of the device image in the same way as the processing in above step S24. In this case, the image determination module 40 extracts feature quantities and feature points from one image in a case that the device image is captured from one direction. Furthermore, the image determination module 40 extracts feature quantities and feature points from device images captured from various directions in a case that the device images are captured from multiple directions.

The image determination module 40 determines whether an IoT device which can be remotely controlled by a user who visually confirms the captured image exists by comparing the feature quantities and feature points extracted from the captured image with the feature quantities and feature points extracted from the device image (step S26). In step S26, the image determination module 40 determines whether the feature quantities and feature points extracted from the device image are consistent with the feature quantities and feature points extracted from the captured image, so as to determine whether the IoT device which can be remotely controlled is captured in the captured image. In a case that it is determined that the feature quantities and feature points extracted from the device image are consistent with the feature quantities and feature points extracted from the captured image, the image determination module 40 determines that the IoT device which can be remotely controlled is captured in the captured image or that an electronic device or an article captured in the captured image can be remotely controlled. On the other hand, in a case that it is determined that the feature quantities and feature points extracted from the device image are not consistent with the feature quantities and feature points extracted from the captured image, the image determination module 40 determines that the IoT device which can be remotely controlled is not captured in the captured image or that an electronic device or an article captured in the captured image cannot be remotely controlled. The image determination module 40 acquires a corresponding identifier of the IoT device determined to be remotely controllable. The image determination module 40 compares the feature quantities and feature points extracted from the device image captured from one direction with the feature quantities and feature points extracted from the acquired captured image. Furthermore, the image determination module 40 compares the feature quantities and feature points extracted from each of the device images captured from multiple directions with the feature quantities and feature points extracted from the acquired captured image. The image determination module 40 may also determine in which direction the image is captured according to comparison results.

In step S26, in a case that the image determination module 40 determines that no IoT device which can be remotely controlled exists (step S26 NO), the current processing ends.

On the other hand, in step S26, in a case that the image determination module 40 determines that the IoT device which can be remotely controlled exists (step S26 YES), the coordinate determination module 41 determines coordinates of the IoT device in the captured image (step S27). In step S27, the coordinate determination module 41 determines the coordinates of the IoT device in the captured image as, for example, a rectangular coordinate system. In this case, the coordinate determination module 41 determines coordinates of a center of the IoT device.

The notification production module 42 produces a frame that surrounds the IoT device based on the determined coordinates and image analysis results (step S28). In step S28, the notification production module 42 produces the frame that surrounds the IoT device according to shape and color changes extracted from the IoT device at the determined coordinates. The frame is, for example, rectangular or circular. In a case that the frame to be produced is rectangular, the notification production module 42 determines coordinates of each vertex of the captured image to produce the frame. Furthermore, in a case that the frame to be produced is circular, the notification production module 42 determines the coordinates of the center of the determined IoT device and a length of a radius to produce the frame. The case that the notification production module 42 produces a rectangular frame will be described below.

The remote notification sending module 21 sends the produced frame as a notification that remote control is possible to the instructing terminal 100 (step S29). In step S29, the notification that remote control is possible is referred to as a notification that that remote control is possible is displayed as augmented reality onto the instructing terminal 100 in a position where the captured image of the IoT device determined to be remotely controllable is captured. The notification that remote control is possible includes the identifier of the IoT device.

The remote notification receiving module 150 receives the notification that remote control is possible. The display module 170 displays augmented reality in the position of the remotely controllable IoT device in the captured image for screen sharing based on the notification that remote control is possible (step S30). In step S30, the display module 170 displays the frame that surrounds the image of the IoT device as augmented reality. The frame is the above rectangular frame. The display module 170 overlays an image of the IoT device in the captured image with the frame that surrounds the IoT device based on the coordinates of each vertex.

Figure 10:
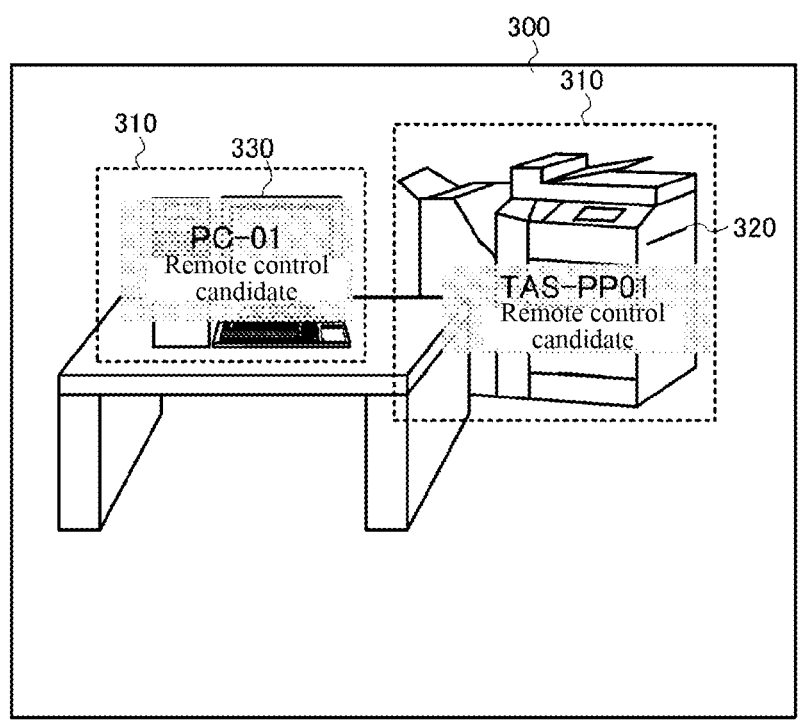
FIG. 10 is a diagram of an example of augmented reality displayed by the instructing terminal 100.

The augmented reality display by the display module 170 will be described based on FIG. 10. FIG. 10 is a diagram of an example of augmented reality displayed by the display module 170. In FIG. 10, the display module 170 displays surrounding frames 310 as augmented reality in a sharing screen 300. The surrounding frames 310 are overlaid with a first IoT device 320 and a second IoT device 330 captured in the captured image displayed in the sharing screen 300 respectively. The display module 170 displays identifiers of the IoT devices and the meaning that remote control is possible inside the surrounding frames 310. When the identifiers and the meaning that remote control is possible are displayed inside the surrounding frames 310, the first IoT device 320 and the second IoT device 330 may be displayed under a state that the first IoT device 320 and the second IoT device 330 can be determined by the user. In the figure, this state is represented by setting the display background to semi-transparent.

The input receiving module 171 determines whether an input operation to the frames displayed by the display module 170 is received (step S31). In step S31, the input receiving module 171 determines whether the input operation to the surrounding frames 310 is received. For example, the input receiving module 171 determines whether a click operation to the inside of the surrounding frames 310, a click operation to content displayed in the surrounding frames 310, a click operation to frame lines of the surrounding frames 310, and other input operations such as voice input and gesture input are received. In step S31, in a case that the input receiving module 171 determines that no input operation is received (step S31 NO), the current processing needs to be repeated. It is to be noted that the input receiving module 171 may also ends the current processing in an event of an input operation which ends the screen sharing or in a case that no input operation is received within specific time.

On the other hand, in step S31, in a case that the input receiving module 171 determines that the input operation is received (step S31 YES), the display module 170 displays a screen required for remotely controlling the IoT device (step S32). In step S32, the display module 170 displays, for example, a login screen as the screen required for remotely controlling the IoT device. The display module 170 displays a screen for receiving the input of the ID and passcode as the login screen. The display module 170 displays the login screen as augmented reality overlaid with the IoT device.

It is to be noted that the display module 170 may also display the login screen at any site of the sharing screen. Furthermore, the display module 170 may also display the login screen outside the sharing screen.

The data transceiving module 151 sends the received input ID and passcode to the first IoT device 320 as login data (step S33). The instructing terminal 100 remotely controls the first IoT device 320 after logging into the first IoT device 320. In this case, the data transceiving module 151 may also send the login data to the computer 10, and the login data is sent to first IoT device 320 via the computer 10.

It is to be noted that the remote control notification system 1 may also display the augmented reality displayed by the instructing terminal 100 onto the to-be-instructed terminal 200. In this case, the remote control notification system 1 sends the notification that remote control is possible to the to-be-instructed terminal 200, and the to-be-instructed terminal 200 displays the augmented reality based on the notification that remote control is possible.

The above is the remote control notification processing.

Variation Example

The variation examples of the above device image data storage processing and remote control notification processing executed by the remote control notification computer system 1 will be described. Details on compositions the same as the components described above and denoted by the same reference numerals will be omitted in the following description.

(Device Image Data Storage Processing)

Figure 7:
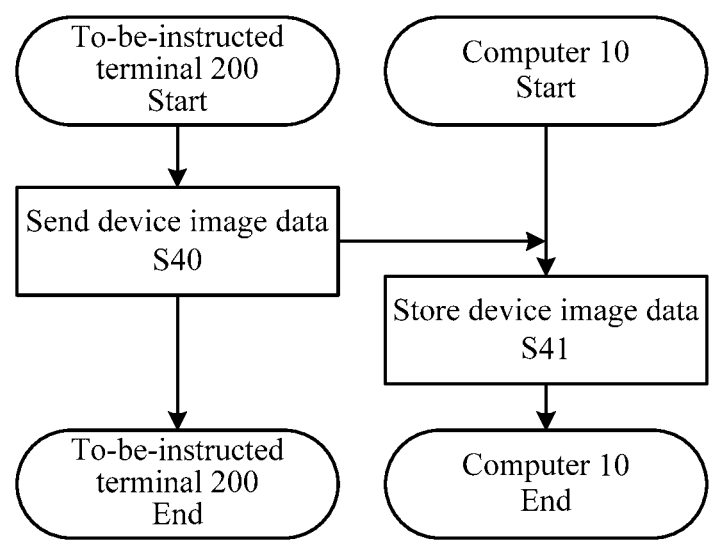
FIG. 7 is a flowchart of a variation example of device image data storage processing executed by the computer 10 and the to-be-instructed terminal 200.

A variation example of the device image data storage processing executed by the remote control notification computer system 1 will be described based on FIG. 7. FIG. 7 is a flowchart of a variation example of device image data storage processing executed by the computer 10 and the to-be-instructed terminal 200. Processing performed by modules of each of the above apparatuses will be described in conjunction with the current processing.

It is to be noted that like the device image data storage processing described above, the current processing is also executed by the computer 10 and the instructing terminal 100. In this case, the instructing terminal 100 executes processing described later which is supposed to be executed by the to-be-instructed terminal 200, and thus details will not be described. Furthermore, like the device image data storage processing described above, the current processing is also executed by the instructing 100 and the to-be-instructed terminal 20. In this case, any one or both of the instructing terminal 100 and the to-be-instructed terminal 200 may execute processing described later which is supposed to be executed by the computer 10, and thus details will not be described.

First, the data transceiving module 250 sends an image of a remotely controllable IoT device and an identifier of the IoT device as well as position information of the IoT device to the computer 10 as device image data (step S40). In step S40, the image of the IoT device sent by the data transceiving module 250 is the same as the image described in above step S10. The position information of the IoT device is position information of a photographing site, position information of an IoT device and the like.

The data transceiving module 20 receives the device image data, and the storage module 30 stores the received device image data (step S41). In step S41, the storage module 30 stores the image, identifier and position information of the IoT device correspondingly.

The above is the variation example of the device image data storage processing. The remote control notification system 1 uses the device image data stored by the computer 10 for processing described later.

(Remote Control Notification Processing)

Figure 8:
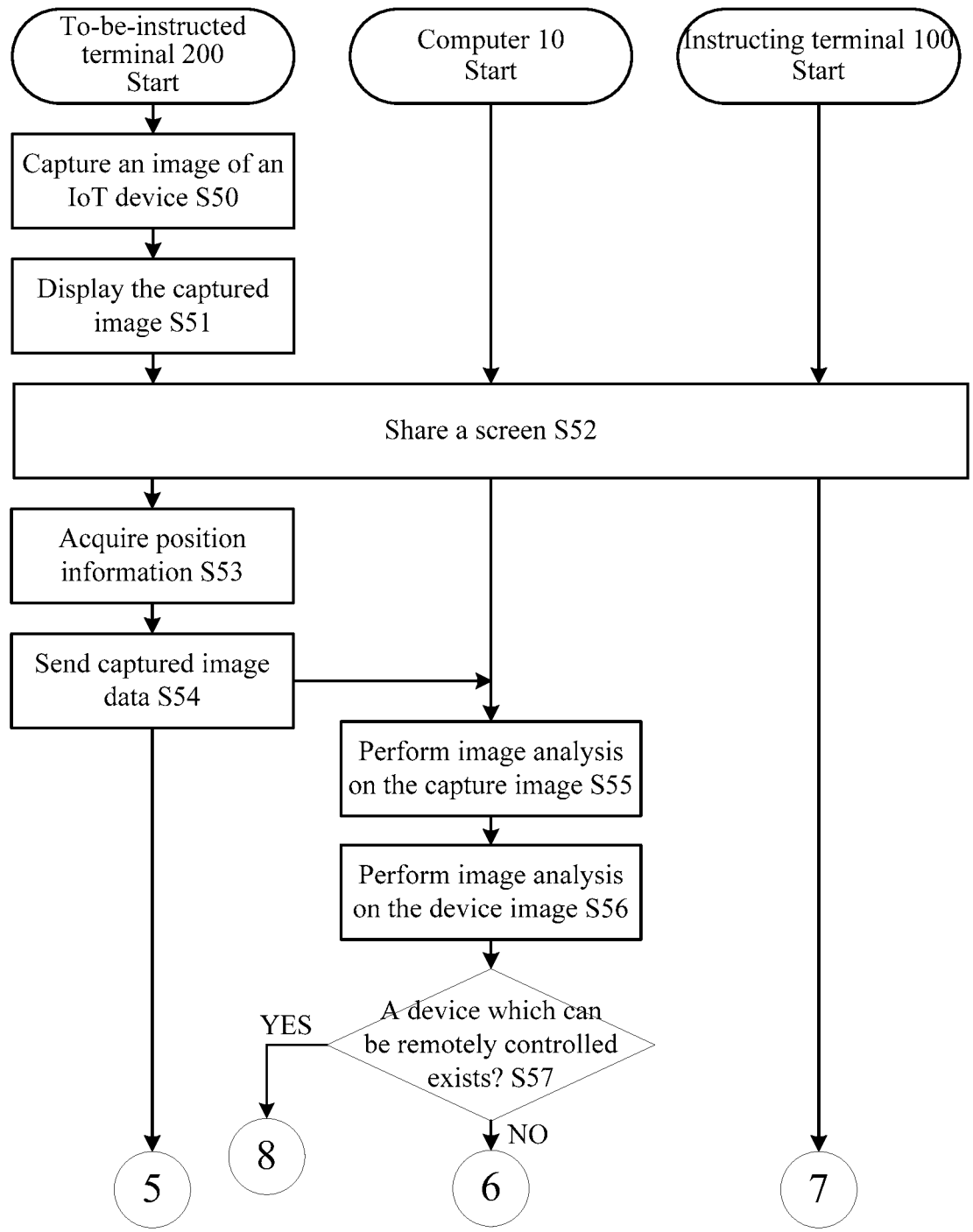
FIG. 8 is a flowchart of a variation example of remote control notification processing executed by the computer 10, the instructing terminal 100 and the to-be-instructed terminal 200.
Figure 9:
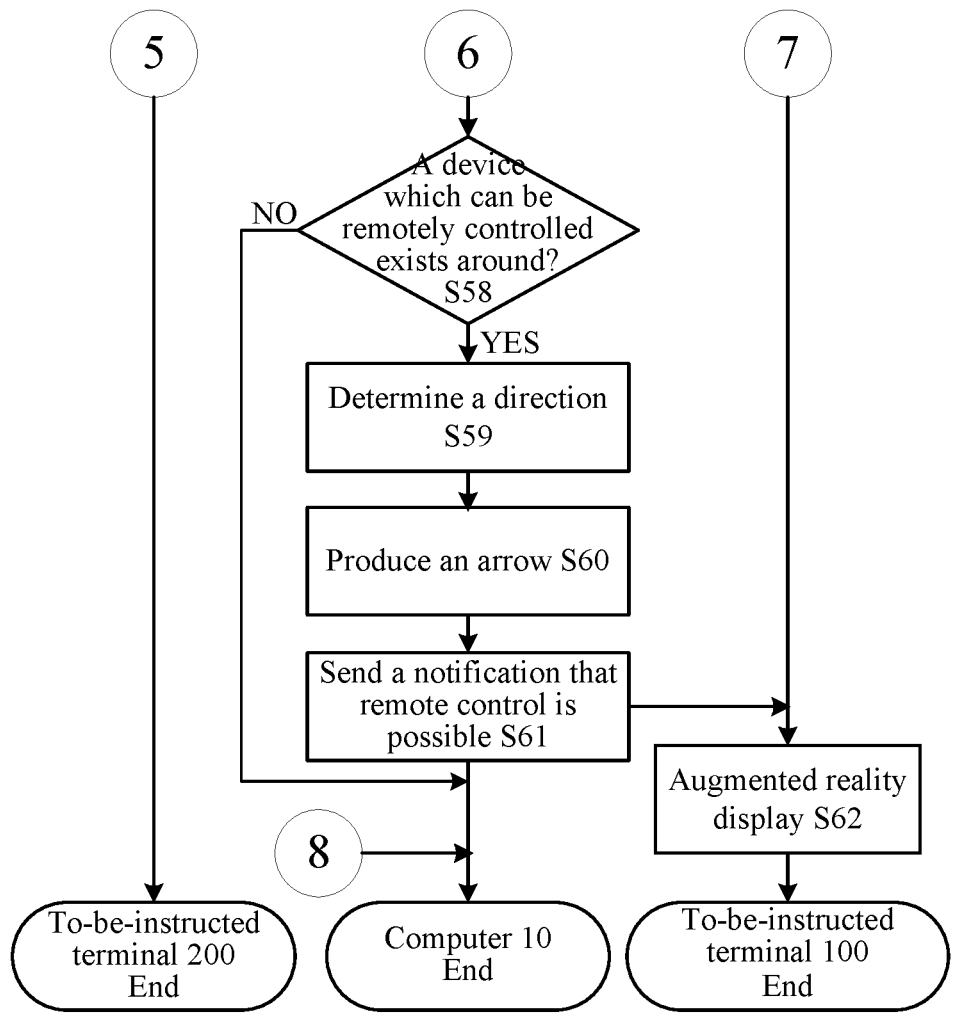
FIG. 9 is a flowchart of a variation example of remote control notification processing executed by the computer 10, the instructing terminal 100 and the to-be-instructed terminal 200.

A variation example of the remote control notification processing executed by the remote control notification computer system 1 will be described based on FIGS. 8 and 9. FIGS. 8 and 9 are flowcharts of variation examples of the remote control notification processing executed by the computer 10, the instructing terminal 100 and the to-be-instructed terminal 200. Processing performed by modules of each of the above apparatuses will be described in conjunction with the current processing.

The remote control notification computer system 1 executes processing in steps S20 to S22 of the above remote control notification processing (steps S50 to S52). Details of the processing will not be described.

The position information acquisition module 251 acquires position information of itself from GPS (step S53). It is to be noted that the processing in step S53 and the above processing in step S50 may also be executed at the same set time. Furthermore, in a case that the captured image displayed via the processing in step S51 is not an image captured this time, the position information of the position information acquisition module 251 is acquired at the set time when the captured image is captured previously.

The data transceiving module 250 sends the captured image captured via the processing in step S50 and the position information of the position information acquisition module 251 acquired via the processing in step S53 to the computer 10 as captured image data (step S54). It is to be noted that the processing in step S54 and the above screen sharing may also be executed simultaneously.

The data transceiving module 20 receives the captured image data. The computer 10 acquires images of the IoT devices and position information of a site where the IoT device is captured by receiving the captured image data.

The remote control notification computer system 1 executes processing in steps S24 to S26 (steps S55 to S57). Details of the processing will be omitted.

In step S57, in a case that the image determination module 40 determines that an IoT device which can be remotely controlled exists (step S57 YES), the processing after step S27 of the above remote control notification processing is executed. It is to be noted that in the current processing, for simplification of description, the description will be omitted, and step S57 will be described as the ending of the processing.

On the other hand, in step S57, in a case that the image determination module 40 determines that no IoT device which can be remotely controlled exists (step S57 NO), the position information determination module 43 determines whether an IoT device which can be remotely controlled exists around the position of the to-be-instructed terminal 200 based on the position information of the captured image data and the position of the device image data (step S58). In step S58, the position information determination module 43 determines whether an IoT device of nearby position information of the position information of the captured image data in the position information having the device image data can be determined. The nearby position information is referred to as, for example, position information in the same room, position information within a range with radius of several meters, and the like. The position information determination module 43 determines whether an IoT device which can be remotely controlled exists around the to-be-instructed terminal 200 by determining whether an IoT device corresponding to position information which meets this condition exists in the position information stored in the storage module 30.

In step S58, in a case that the position information determination module 43 determines that no IoT device exists (step S58 NO), the current processing ends.

On the other hand, in step S58, in a case that the position information determination module 43 determines that the IoT device exists (step S58 YES), the position information determination module 43 determines a direction where the remotely controllable IoT is located based on the position information of the captured image data and the position information of the device image data (step S59). In step S59, the position information determination module 43, taking the to-be-instructed terminal 200 as the center, determines in which direction (e.g., right, right rear, left or left rear) the IoT device which can be remotely controlled exists.

The notification production module 42 produces an arrow that can represent the direction where the remotely controllable IoT device is located based on the determined direction (step S60). In step S60, the notification production module 42 produces an arrow which represents in which direction the IoT device is located with respect to the captured image. The arrow is produced, for example, in the lower left of the captured image when the IoT device is located on the rear left side as viewed from the captured image, and in the right of the captured image when the IoT device is located on the right side as viewed from the captured image. The case that the notification production module 42 produces the arrow on the rear left side and the right side of the captured image will be described below.

The remote notification sending module 21 sends the produced arrow to the to-be-instructed terminal 200 as a notification that remote control is possible which represents that the remotely controllable IoT device is located in this direction (step S61). In step S61, the notification that remote control is possible is referred to as a notification that the direction where the IoT device determined to be remotely controllable is located is displayed in the captured image as augmented reality. The notification that remote control is possible includes the identifier of the IoT device.

The remote notification receiving module 252 receives the notification that remote control is possible. The display module 271 displays the direction where the remotely controllable IoT device is located as augmented reality onto the captured image for screen sharing based on the notification that remote control is possible (step S62). In step S63, the display module 271 displays the arrow that represents the direction where the IoT device is located as augmented reality. The display module 271 displays the arrow by overlaying the arrow with the captured image.

Figure 11:
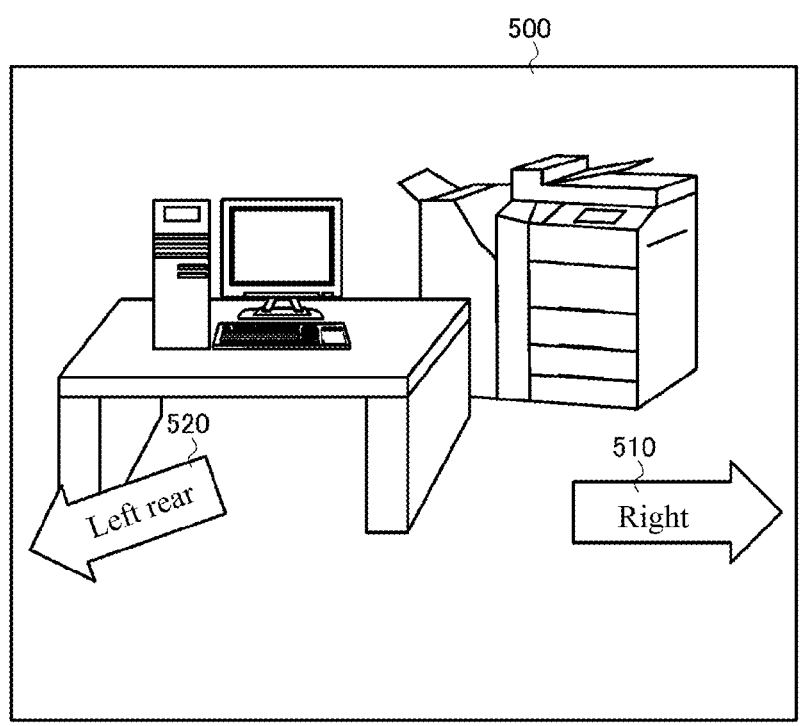
FIG. 11 is a diagram of an example of augmented reality displayed by the to-be-instructed terminal 200.

The augmented reality display by the display module 271 will be described based on FIG. 11. FIG. 11 is a diagram of an example of augmented reality displayed by the display module 271. In FIG. 11, the display module 271 displays a first arrow 510 and a second arrow 520 as augmented reality in a sharing screen 500. The meaning representing the direction where the IoT device is located is displayed inside the first arrow 510 and the second arrow 520. The first arrow 510 and the second arrow 520 represent the direction of a site where the remotely controllable IoT device is located respectively. The two arrows may point to the same IoT device, or may point to different IoT devices.

The user confirms the augmented reality visually, and makes the to-be-instructed terminal 200 move in a direction different from a direction where the image is captured last time to capture a captured image. The remote control notification system 1 executes the processing in above steps S50 to S57, and in a case that it is determined that a remotely controllable IoT device exists, executes the processing after step S27 of the above remote control notification processing. It is to be noted that in the current processing, for simplification of description, the description will be omitted, and the processing ends.

It is to be noted that the remote control notification system 1 may also display augmented reality displayed by the to-be-instructed terminal 200 onto the instructing terminal 100. In this case, the remote control notification system 1 sends the notification that remote control is possible to the instructing terminal 100, and the instructing terminal 100 displays augmented reality based on the notification that remote control is possible.

The above is the variation example of the remote control notification processing.

It is to be noted that the remote control notification system 1 may also execute the above processing in a combination manner. For example, in a case that the device image data and the captured image data include the position information, the surrounding frame 310 may also be displayed onto the instructing terminal 100 as augmented reality, and the first arrow 510 and the second arrow 520 may be displayed onto the to-be-instructed terminal as augmented reality.

The above units and functions are implemented by reading and executing specified programs by a computer (including a CPU, an information processing apparatus and various terminals). The programs, for example, are provided by a solution provided by a computer via a network (i.e., software as a service (SaaS)). Furthermore, the programs are provided a solution recorded in a computer-readable recording medium such as a floppy disk, a compact disk (CD) (such as a compact disc read-only memory (CD-ROM)), and a digital versatile disc (DVD) (such as a DVD-ROM and a DVD random access memory (DVD-RAM)). In this case, the computer reads the programs from the recording medium and transfers the programs to an internal storage device or an external storage device for storage and execution. Furthermore, the programs may also be recorded in advance on a storage apparatus (recording medium) such as a magnetic disk, an optical disk or a magneto-optical disk, and provided from the storage apparatus for the computer via a communication line.

The embodiments of the present invention have been described above, but the present invention is not limited to the above embodiments. Furthermore, the effects described in the embodiments of the present invention are merely illustrative of the most appropriate effects produced by the present invention, and the effects of the present invention are not limited to the effects described in the embodiments of the present invention.

LIST OF REFERENCE NUMBERS 1 remote control notification system, 1 computer, 100 instructing terminal, and 200 to-be-instructed terminal.

What is claimed is:

1. A computer system, comprising:
an acquisition unit, which is configured to acquire images of Internet of Things (IoT) devices;
a storage unit, which is configured to pre-store images of remotely controllable IoT devices, wherein the pre-stored images are captured from multiple directions; and
a determination unit, which is configured to: determine, according to the pre-stored images of captured from the multiple directions, a direction from which the pre-stored images are captured through image recognition which involves comparing the pre-stored images with the acquired images, and determine, from a determination result and the acquired images, an IoT device which is capable of being remotely controlled by a user who visually confirms an image of the IoT device;
a first notification unit, which is configured to, in a position where the image of the IoT device determined to be remotely controllable is captured, display a status that remote control is possible through augmented reality; and
a second notification unit, which is configured to, in condition that the IoT device which is capable of being remotely controlled is determined to be not existed and other IoT devices which are capable of being remotely controlled exist around the position where the image is captured, display a direction in the other IoT devices which are capable of being remotely controlled is located through augmented reality.

2. The computer system of claim 1, wherein
the notification unit is configured to display the status that remote control is possible by using a frame that surrounds the image of the IoT device through the augmented reality; and
wherein the computer system further comprises: a display unit, which is configured to receive an input operation in the displayed frame, and display, according to the input operation, a login screen for remotely controlling the IoT device.

3. A remote control notification method, executed by a computer system, comprising:
acquiring images of Internet of Things (IoT) devices;
pre-storing images of remotely controllable IoT devices, wherein the pre-stored images are captured from multiple directions;
determining, according to the pre-stored images of captured from the multiple directions, a direction from which the pre-stored images are captured through image recognition which involves comparing the pre-stored images with the acquired images, and determining, from a determination result and the acquired images, an IoT device which is capable of being remotely controlled by a user who visually confirms an image of the IoT device;

in a position where the image of the IoT device determined to be remotely controllable is captured, displaying a status that remote control is possible through augmented reality; and in condition that the IoT device which is capable of being remotely controlled is determined to be not existed and other IoT devices which are capable of being remotely controlled exist around the position where the image is captured, displaying a direction in the other IoT devices which are capable of being remotely controlled is located through augmented reality.

4. A program, which is configured to enable a computer system to execute the following steps:

acquiring images of Internet of Things (IoT) devices;

pre-storing images of remotely controllable IoT devices, wherein the pre-stored images are captured from multiple directions;

determining, according to the pre-stored images of captured from the multiple directions, a direction from which the pre-stored images are captured through image recognition which involves comparing the pre-stored images with the acquired images, and determining, from determination result and the acquired images, an IoT device which is capable of being remotely controlled by a user who visually confirms an image of the IoT device;

in a position where the image of the IoT device determined to be remotely controllable is captured, displaying a status that remote control is possible through augmented reality; and in condition that the IoT device which is capable of being remotely controlled is determined to be not existed and other IoT devices which are capable of being remotely controlled exist around the position where the image is captured, display a direction in the other IoT devices which are capable of being remotely controlled is located through augmented reality.

\* \* \* \* \*